US012088762B2

(12) United States Patent
Seigneurbieux

(10) Patent No.: US 12,088,762 B2
(45) Date of Patent: *Sep. 10, 2024

(54) SYSTEMS AND METHODS FOR VIDEOCONFERENCING WITH SPATIAL AUDIO

(71) Applicant: Verizon Patent and Licensing Inc., Basking Ridge, NJ (US)

(72) Inventor: Pierre Seigneurbieux, Mountain View, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,937

(22) Filed: May 25, 2023

(65) Prior Publication Data
US 2023/0300251 A1 Sep. 21, 2023

Related U.S. Application Data

(63) Continuation of application No. 17/467,871, filed on Sep. 7, 2021, now Pat. No. 11,700,335.

(51) Int. Cl.
*H04M 3/56* (2006.01)
(52) U.S. Cl.
CPC .......... *H04M 3/568* (2013.01); *H04M 3/567* (2013.01)
(58) Field of Classification Search
CPC .. H04M 3/568; H04M 3/567; H04M 2201/42; H04R 2499/15; H04S 2400/11; H04S 7/303; H04S 7/40
See application file for complete search history.

(56) References Cited

U.S. PATENT DOCUMENTS

| | | | | | |
|---|---|---|---|---|---|
| 5,991,385 | A | * | 11/1999 | Dunn ................ | H04M 3/568 381/1 |
| 6,327,567 | B1 | * | 12/2001 | Willehadson ........ | H04M 3/564 704/231 |
| 6,961,439 | B2 | * | 11/2005 | Ballas .................. | H04S 1/005 381/310 |
| 7,346,654 | B1 | * | 3/2008 | Weiss .................. | H04N 7/15 348/E7.083 |
| 9,602,295 | B1 | * | 3/2017 | Weiner ................ | H04L 65/403 |
| 9,942,513 | B1 | * | 4/2018 | Aarrestad ........... | H04N 7/147 |

(Continued)

FOREIGN PATENT DOCUMENTS

| | | | | | |
|---|---|---|---|---|---|
| EP | 2337328 | A1 | * | 6/2011 | ............ H04M 3/56 |
| EP | 2922237 | A1 | * | 9/2015 | ......... H04L 12/1827 |

(Continued)

*Primary Examiner* — Akelaw Teshale

(57) ABSTRACT

A system may provide for the generation of spatial audio for audiovisual conferences, video conferences, etc. (referred to herein simply as "conferences"). Spatial audio may include audio encoding and/or decoding techniques in which a sound source may be specified at a location, such as on a two-dimensional plane and/or within a three-dimensional field, and/or in which a direction or target for a given sound source may be specified. A conference participant's position within a conference user interface ("UI") may be set as the source of sound associated with the conference participant, such that different conference participants may be associated with different sound source positions within the conference UI.

20 Claims, 14 Drawing Sheets

(56) References Cited

U.S. PATENT DOCUMENTS

| | | | |
|---|---|---|---|
| 9,986,360 B1* | 5/2018 | Aas | H04M 3/569 |
| 11,115,625 B1* | 9/2021 | Stuan | H04R 1/406 |
| 11,190,899 B2* | 11/2021 | Stringer | H04S 5/005 |
| 11,825,026 B1* | 11/2023 | Marrin | H04S 7/302 |
| 2004/0013252 A1* | 1/2004 | Craner | H04M 1/247 |
| | | | 379/142.01 |
| 2008/0144794 A1* | 6/2008 | Gardner | H04M 3/568 |
| | | | 379/202.01 |
| 2009/0080632 A1* | 3/2009 | Zhang | H04M 3/56 |
| | | | 379/202.01 |
| 2011/0077755 A1* | 3/2011 | Yoakum | H04L 65/4015 |
| | | | 700/94 |
| 2012/0098921 A1* | 4/2012 | Stedman | H04N 7/15 |
| | | | 348/E7.083 |
| 2015/0035940 A1* | 2/2015 | Shapiro | A63F 13/57 |
| | | | 348/14.12 |
| 2016/0006879 A1* | 1/2016 | Dickins | H04M 3/568 |
| | | | 379/406.03 |
| 2016/0134988 A1* | 5/2016 | Gorzel | G10L 19/00 |
| | | | 381/22 |
| 2016/0212272 A1* | 7/2016 | Srinivasan | H04N 21/41407 |
| 2016/0286327 A1* | 9/2016 | Marten | H04R 29/008 |
| 2019/0215637 A1* | 7/2019 | Lee | H04S 7/30 |
| 2022/0095052 A1* | 3/2022 | Nielsen | H04R 1/406 |
| 2022/0124448 A1* | 4/2022 | Barreiro | A63F 13/25 |
| 2022/0225050 A1* | 7/2022 | Ninan | G06F 3/011 |
| 2023/0073569 A1* | 3/2023 | Seigneurbieux | H04S 7/40 |

FOREIGN PATENT DOCUMENTS

| | | | | |
|---|---|---|---|---|
| EP | 3637680 A1 * | 4/2020 | | G06F 3/165 |
| EP | 1754393 B1 * | 12/2020 | | G06T 15/00 |
| GB | 2349055 A * | 10/2000 | | H04N 7/15 |
| RU | 2694335 C1 * | 7/2019 | | H04M 3/56 |
| WO | WO-2009102557 A1 * | 8/2009 | | H04L 12/1827 |
| WO | WO-2010040408 A1 * | 4/2010 | | H04M 3/56 |
| WO | WO-2010136634 A1 * | 12/2010 | | H04M 3/568 |
| WO | WO-2013142657 A1 * | 9/2013 | | H04M 3/568 |
| WO | WO-2016126767 A1 * | 8/2016 | | G06F 16/61 |
| WO | WO-2016126768 A2 * | 8/2016 | | G10L 15/005 |
| WO | WO-2016126813 A2 * | 8/2016 | | G10L 21/043 |
| WO | WO-2016126819 A1 * | 8/2016 | | G10L 25/78 |
| WO | WO-2017211447 A1 * | 12/2017 | | |
| WO | WO-2018226508 A1 * | 12/2018 | | G06T 3/00 |

* cited by examiner

SYSTEMS AND METHODS FOR VIDEOCONFERENCING WITH SPATIAL AUDIO

CROSS-REFERENCE TO RELATED APPLICATION

This Application is a Continuation of U.S. patent application Ser. No. 17/467,871, filed on Sep. 7, 2021, titled "SYSTEMS AND METHODS FOR VIDEOCONFERENCING WITH SPATIAL AUDIO," the contents of which are herein incorporated by reference in their entirety.

BACKGROUND

Organizations, enterprises, institutions, etc. are increasingly making use of teleconferencing for meetings between members. Such teleconferencing may include video calls, voice calls, audiovisual conferences, or the like.

DETAILED DESCRIPTION OF EXAMPLE EMBODIMENTS

The following detailed description refers to the accompanying drawings. The same reference numbers in different drawings may identify the same or similar elements.

Embodiments described herein provide for the generation of spatial audio for audiovisual conferences, video conferences, etc. (referred to herein simply as "conferences"). "Spatial audio," as referred to herein, may include audio encoding and/or decoding techniques in which a sound source may be specified at a location (e.g., on a two-dimensional plane and/or within a three-dimensional field), and/or in which a direction or target for a given sound source may be specified.

Figure 1:
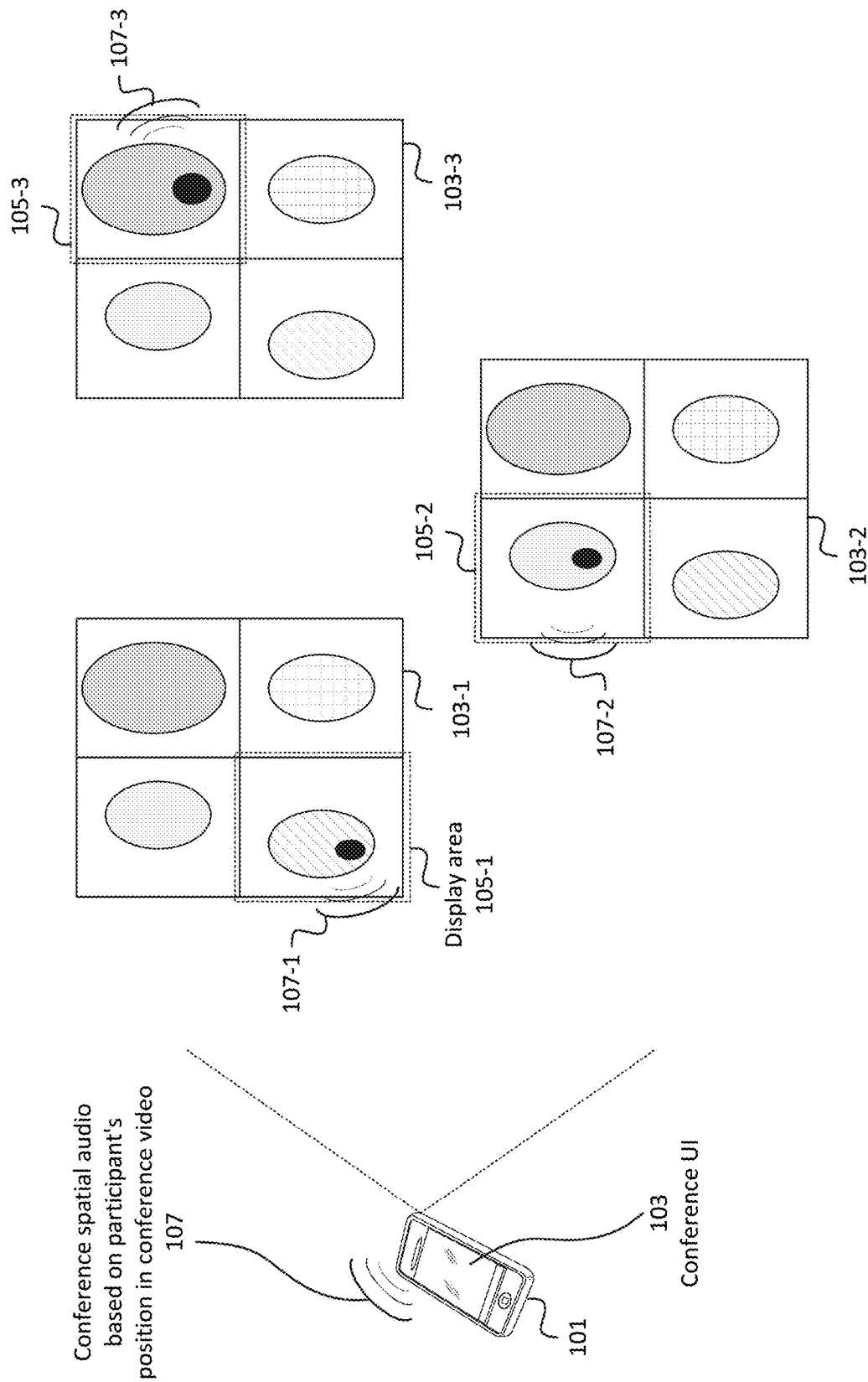
FIGS. 1 and 2 illustrate an example overview of one or more embodiments described herein.

For example, as shown in FIG. 1, UE 101 may be a participant in a conference in which multiple participants (e.g., other UEs, such as other mobile telephones, tablets, laptops, workstations, etc.) may be involved. UE 101 may present (e.g., display) a conference user interface ("UI") 103, which may depict video information associated with other participant UEs of the conference. For example, each respective UE of the conference may capture video of one or more users of the respective UE, and conference UI 103 may include the captured video from the participant UEs of the conference. In this example, conference UI 103 may include four display areas 105, where each display area 105 is associated with a different participant of the conference. For example, display area 105-1 may be associated with a first participant, display area 105-2 may be associated with a second participant, etc.

UE 101 may also include one or more audio output devices (e.g., one or more speakers), via which UE 101 may output spatial conference audio 107, which may include audio that is processed and/or presented differently based on which particular display area 105 the audio is associated. For example, UI 103-1 illustrates an example in which a user that is associated with display area 105-1 is speaking, UI 103-2 illustrates an example in which a user that is associated with display area 105-2 is speaking, and UI 103-3 illustrates an example in which a user that is associated with display area 105-3 is speaking.

In accordance with some embodiments, when the user shown in display area 105-1 is speaking (e.g., as shown in UI 103-1), first spatial audio 107-1 may be presented by UE 101. For example, a "source" of audio 107-1 may be set to display area 105-1 (and/or a particular position within display area 105-1). In some embodiments, the "source" of the audio may be specified according to a spatial audio encoding and/or decoding technique, such as Dolby Atmos, DTS:X, or some other suitable spatial audio encoding and/or decoding technique. As another example, when the user shown in in display area 105-2 is speaking (e.g., as shown in UI 103-2), second spatial audio 107-2 may be presented by UE 101, which may include the "source" of audio 107-2 being set to display area 105-2 (and/or a particular position within display area 105-2). Similarly, when the user shown in in display area 105-3 is speaking (e.g., as shown in UI 103-3), second spatial audio 107-3 may be presented by UE 101, which may include the "source" of audio 107-3 being set to display area 105-3 (and/or a particular position within display area 105-3).

The presenting of spatial audio 107 may enhance the user experience of a user of UE 101 by providing better cues as to who is speaking. For example, since the "source" of spatial audio 107 may be specified based on a position of a speaking user within conference UI 103, the user of UE 101 may perceive both visibly (e.g., based on a particular display area 105 within conference UI 103) and audibly (e.g., based on a source of spatial audio 107) who is speaking at any given time.

Figure 2:
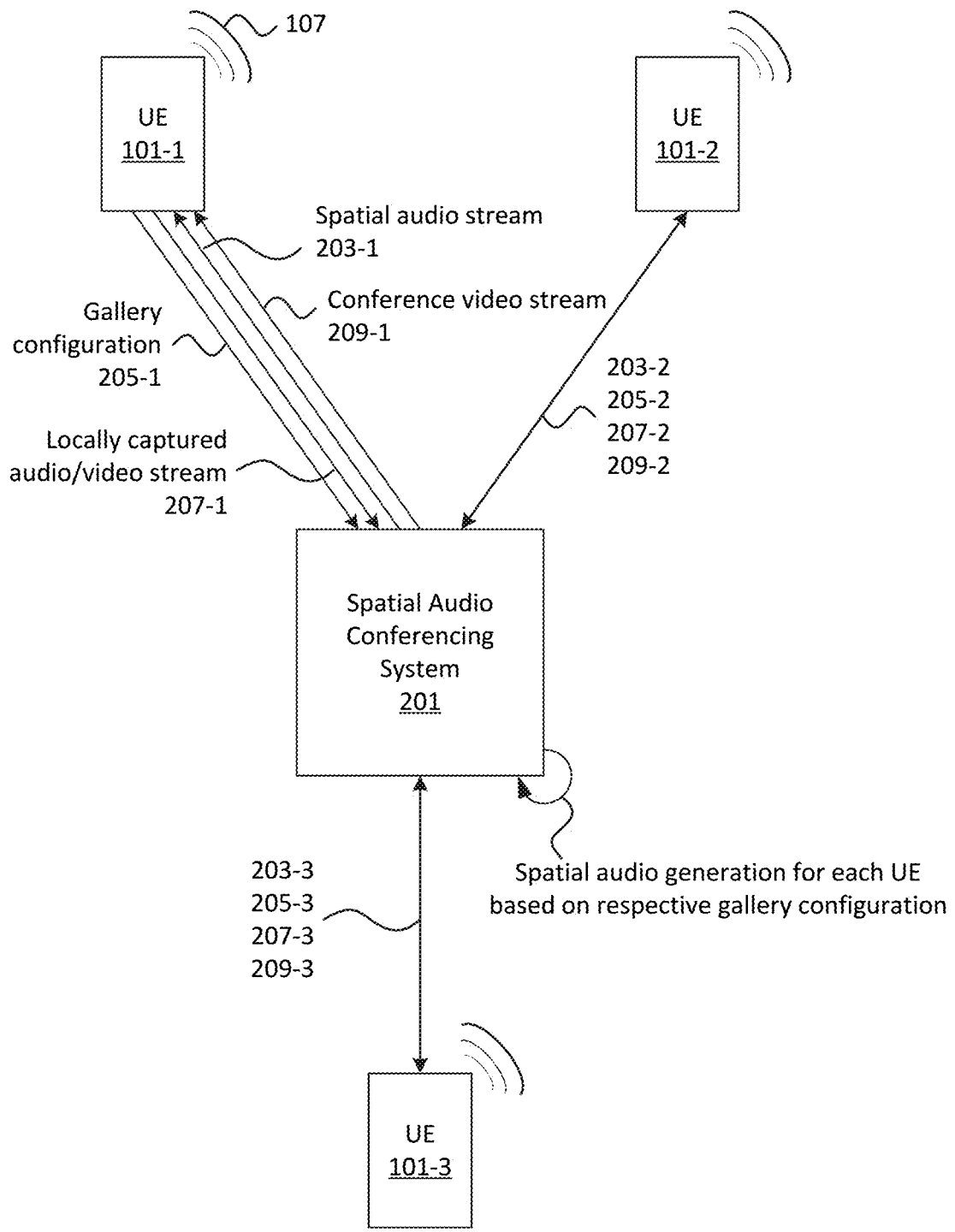

As shown in FIG. 2, Spatial Audio Conferencing System ("SACS") 201 may provide different spatial audio streams 203 to different UEs 101 associated with a given conference. In some embodiments, SACS 201 may be implemented as one device or system. In other embodiments, SACS 201 may include one or more devices or systems that communicate with each other and/or collectively perform one or more of the operations discussed below with respect to SACS 201. For example, SACS 201 may be, may include, and/or may be implemented by a web server, an application server, a cloud computing system, a Multi-Access/Mobile Edge Computing ("MEC") device, referred to sometimes herein simply as a "MEC," and/or some other device or system. SACS 201 may communicate with UEs 101 via a wireless network (e.g., a Long-Term Evolution ("LTE") network, a Fifth Generation ("5G") network, etc.), the Internet, and/or one or more other networks.

As shown, each UE 101 may provide respective gallery configuration information 205 to SACS 201. For example, gallery configuration information 205-1 may be provided by UE 101-1, gallery configuration information 205-2 may be provided by UE 101-2, and gallery configuration information 205-3 may be provided by UE 101-3. As discussed herein, gallery configuration information 205 for a particular UE 101 may specify one or more parameters regarding conference video presentation, such as an indication of display areas 105 displayed by UE 101 via conference UI 103. For example, gallery configuration information 205 for a given UE 101 may include dimensions of conference UI 103, and/or dimensions and/or locations (e.g., specified as pixel-level coordinates or in some other suitable manner) of display areas 105 within conference UI 103. For example, gallery configuration information 205-1 may indicate that video associated with UE 101-2 is presented via a first position within conference UI 103 (e.g., within a first display area 105), while video associated with UE 101-3 is presented in a second position within conference UI 103 (e.g., within a second display area 105).

Figure 3:
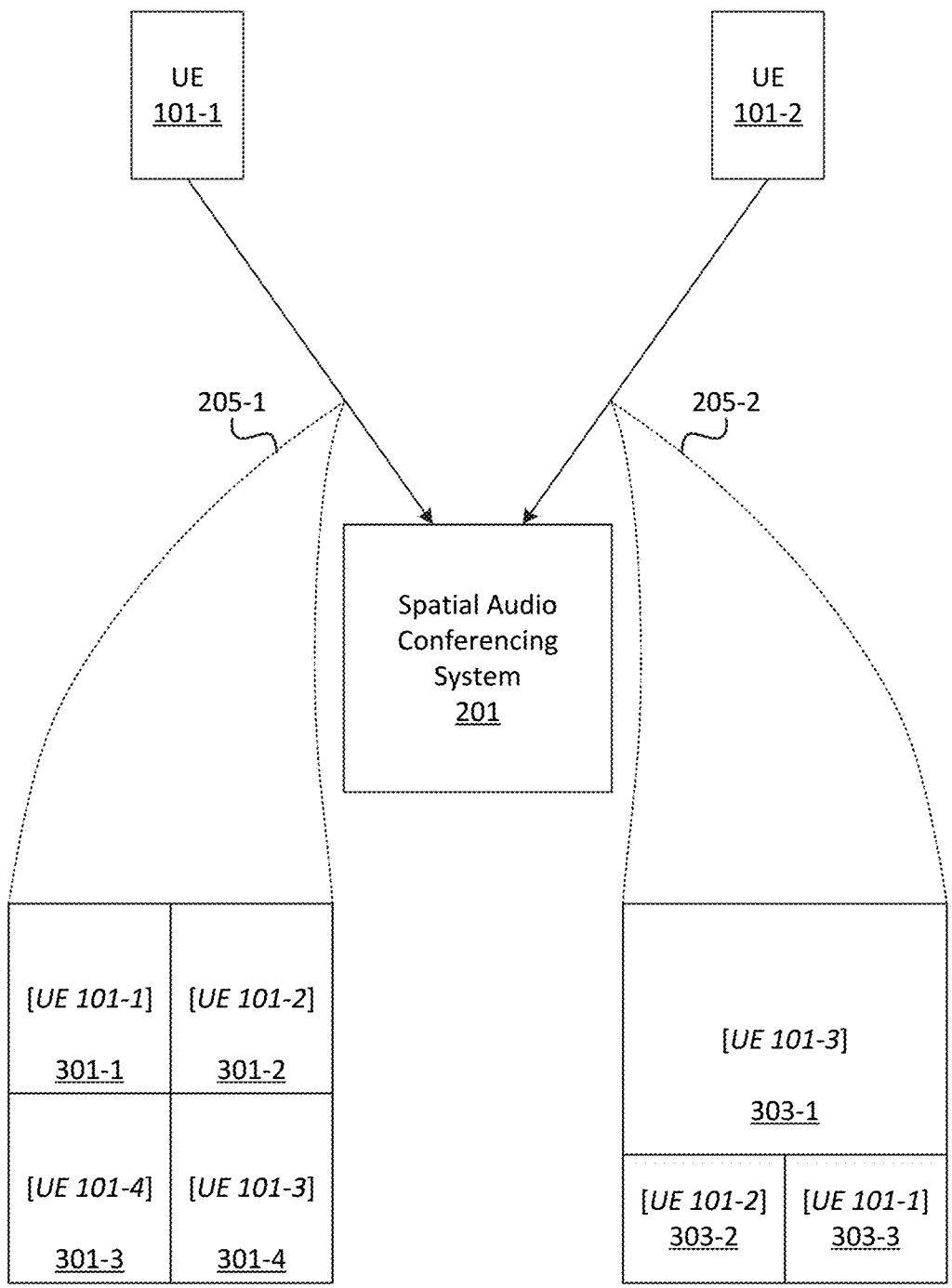
FIG. 3 illustrates example gallery configurations that may be associated with different conference participants, in accordance with one or more embodiments.

For example, as shown in FIG. 3, gallery configuration information 205-1, associated with UE 101-1, may indicate that a conference UI associated with UE 101-1 includes example display areas 301-1 through 301-4. In this example, display area 301-1 may be associated with UE 101-1 (e.g., may display a user of UE 101-1 itself), display area 301-2 may be used to present video associated with UE 101-2, display area 301-3 may be used to present video associated with UE 101-3, and display area 301-4 may be used to present video associated with UE 101-4. On the other hand, gallery configuration information 205-2, associated with UE 101-2, may include a different set of display areas 303-1 (associated with UE 101-3), 303-2 (associated with UE 101-2), and 303-3 (associated with UE 101-1).

Returning to FIG. 2, UE 101 may also provide a locally captured audio stream, a locally captured video stream, and/or a combined audio/video stream 207. The audio and/or video may be "locally" captured by one or more input devices integrated in or communicatively coupled to UE 101, such as one or more microphones, cameras, etc. In some embodiments, the audio and/or video associated with a given UE 101 may be "synthetic" or automatically generated audio and/or video. For example, the audio associated with a given UE 101 may include automatically generated audio based on text provided by UE 101, and/or the video associated with a given UE 101 may include automatically generated video based on annotations or other indications provided by UE 101.

Based on the respective gallery configuration information 205 and audio and/or video stream(s) 207 provided by or associated with each given UE 101, SACS 201 may generate a respective spatial audio stream 203 for each UE 101. For example, gallery configuration information 205-1 may indicate a first arrangement and/or positioning of participant UEs in a respective spatial audio stream 203 associated with UE 101-1, and spatial audio stream 203-1 may be encoded and/or otherwise generated based on the arrangement and/or positioning of participant UEs in spatial audio stream 203. For example, when receiving audio stream 207 from UE 101-2, SACS 201 may mix, encode, and/or otherwise generate spatial audio stream 203-1 based on a position of UE 101-2 in spatial audio stream 203 associated with UE 101-1 (e.g., as indicated by gallery configuration information 205-1). Similarly, when receiving audio stream 207 from UE 101-2, SACS 201 may mix, encode, and/or otherwise generate spatial audio stream 203-3 based on a position of UE 101-2 in spatial audio stream 203 associated with UE 101-3 (e.g., as indicated by gallery configuration information 205-3). That is, since different UEs 101 may be associated with different gallery configuration information 205 (e.g., as discussed above with respect to FIG. 3), spatial audio streams 203 for different UEs 101 may be different, in situations where UEs 101 are associated with different instances of gallery configuration information 205.

In some embodiments, spatial audio stream 203 may be provided as an encoded audio stream, in which particular positions, locations, etc. within a respective conference UI 103 associated with a particular UE 101 may be specified for different participant UEs. The particular UE 101 may include, implement, etc. a decoder that decodes the encoded audio stream and generates spatial audio based on the indicated positions, locations, etc. of the particular participant UE with which the audio is associated. Additionally, or alternatively, SACS 201 may perform digital and/or analog signal processing based on the positions, locations, etc. and provide spatial audio stream 203 as an encoded audio stream or as an unencoded audio stream. For example, in order to provide one or more effects (e.g., the effect of a given audio source being at a particular location within a given conference UI 103, the effect of a given audio source projecting sound to a particular target location, etc.), sound from different audio channels (e.g., a left channel, a right channel, etc.) may be processed differently, such as by introducing time delay, altering pitch, performing doppler shifts, and/or other suitable operations.

Thus, in some embodiments, spatial audio stream 203 may include an encoded digital audio stream with such effects applied or indicated digitally, and UE 101 may include a decoder (e.g., a Digital-to-Analog Converter ("DAC"), a Digital Sound Processor ("DSP"), and/or other some other suitable component) that produces analog waveforms based on the digital audio stream in order to provide the spatial audio effects. Additionally, or alternatively, spatial audio stream 203 may be provided in some other suitable manner, such that UE 101 receiving spatial audio stream 203 may present spatial audio effects in a manner described herein.

Video stream 209 may include an aggregated video stream for a particular UE 101, based on local video streams 207 received from other participant UEs. Additionally, or alternatively, video stream 209 may include multiple video streams 207 and/or may include annotations, metadata, etc. based on which each individual participant UE may present respective UIs 103 (e.g., based on different gallery configurations associated with each respective participant UE, as similarly discussed with respect to FIG. 3).

Figure 4A:
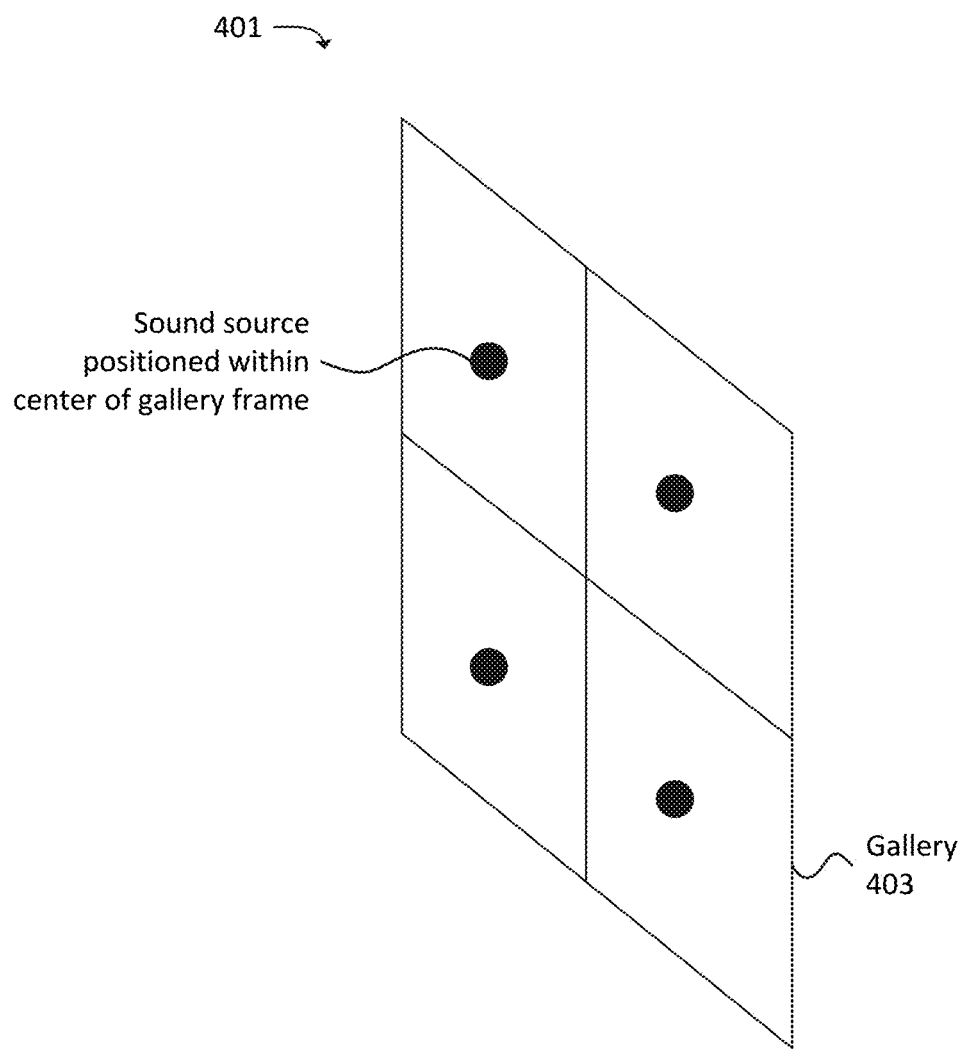
FIGS. 4A, 4B, and 5-9 illustrate example spatial audio effects that may be applied to audio associated with different conference participants, in accordance with one or more embodiments.

FIGS. 4A, 4B, and 5-9 illustrate example spatial audio effects that may be applied (e.g., by SACS 201) to audio streams associated with particular conference participants based on a respective gallery configuration information 205 associated with a particular UE 101 that presents audio and/or video associated with such conference participants. For example, as shown in FIG. 4A, a particular example gallery configuration 401, associated with a particular UE 101, may include information defining gallery 403, which may include a three-dimensional field or two-dimensional plane. In this example, gallery 403 is a two-dimensional plane that represents four display areas 105 of a particular conference UI 103 associated with the particular UE 101. In this example, each display area 105 of conference UI 103 is a quadrant of conference UI 103. Further, in this example, a sound source associated with a given quadrant (e.g., associated with a particular participant) may be centered within the quadrant. In accordance with examples provided below, in some embodiments, display areas 105 may be arranged or distributed within conference UI 103 in some other manner.

Figure 4B:
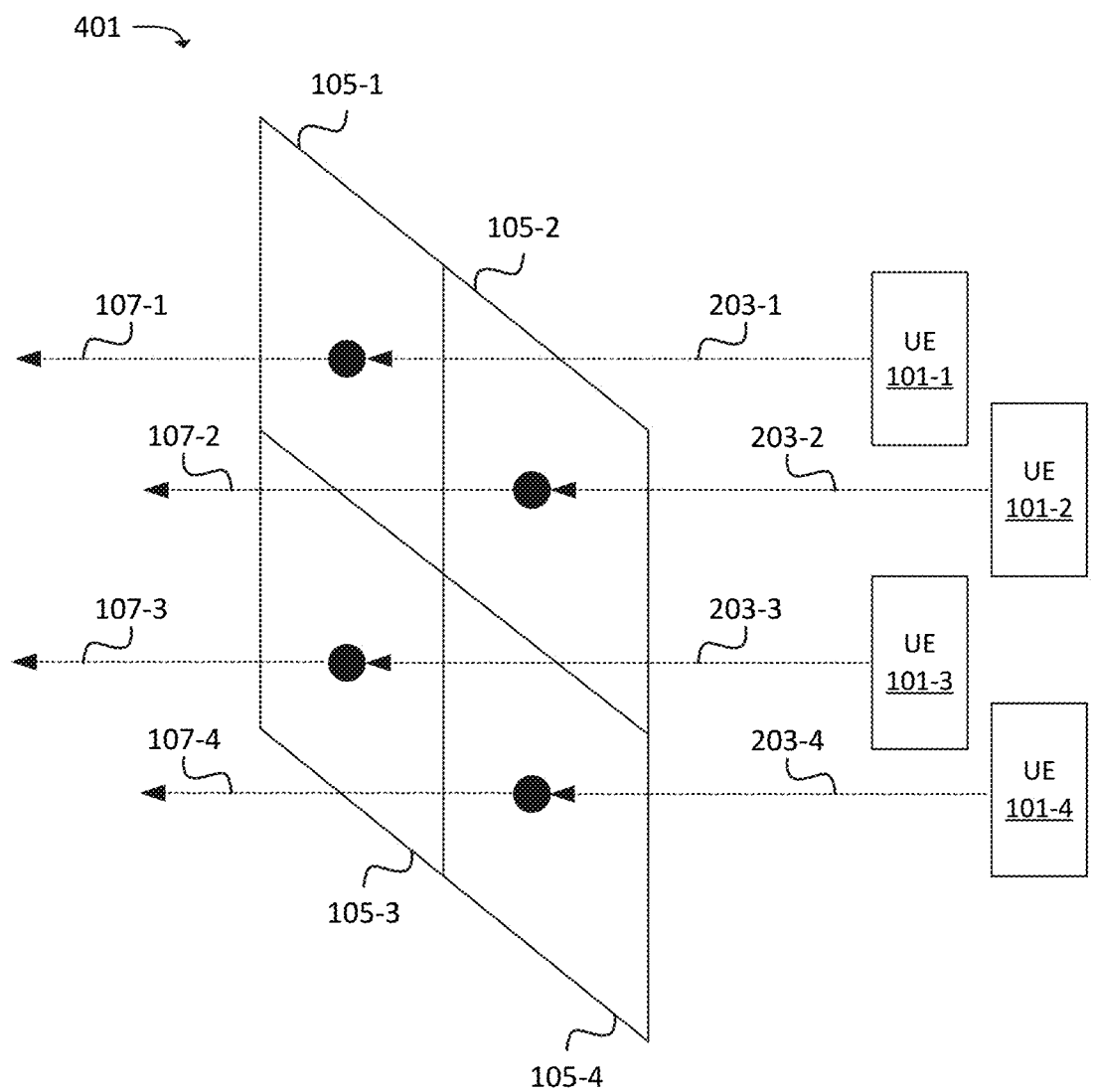

In some embodiments, a particular audio stream 207 associated with a respective participant UE may be encoded, presented, etc. such that a particular display area 105, that corresponds to the respective participant UE, may be specified as the source of such audio stream 203. For example, as shown in FIG. 4B, a sound source of associated with a first display area 105-1 may be located within display area 105-1. As shown, for example, a first audio stream 203-1 may correspond to a first participant UE 101-1 and may be presented by a particular UE 101 as spatial audio 107-1, with display area 105-1 (and/or a particular position within display area 105-1) as a source of spatial audio 107-1. As another example, a second audio stream 203-2 may correspond to a second participant UE 101-2 and may be presented by a particular UE 101 as spatial audio 107-2, with display area 105-2 (and/or a particular position within display area 105-2) as a source of spatial audio 107-2. Similar concepts may apply to UEs 101-3 and 101-4, audio streams 203-3 and 203-4, display areas 105-3 and 105-4, and spatial audio 107-3 and 107-4.

Figure 5:
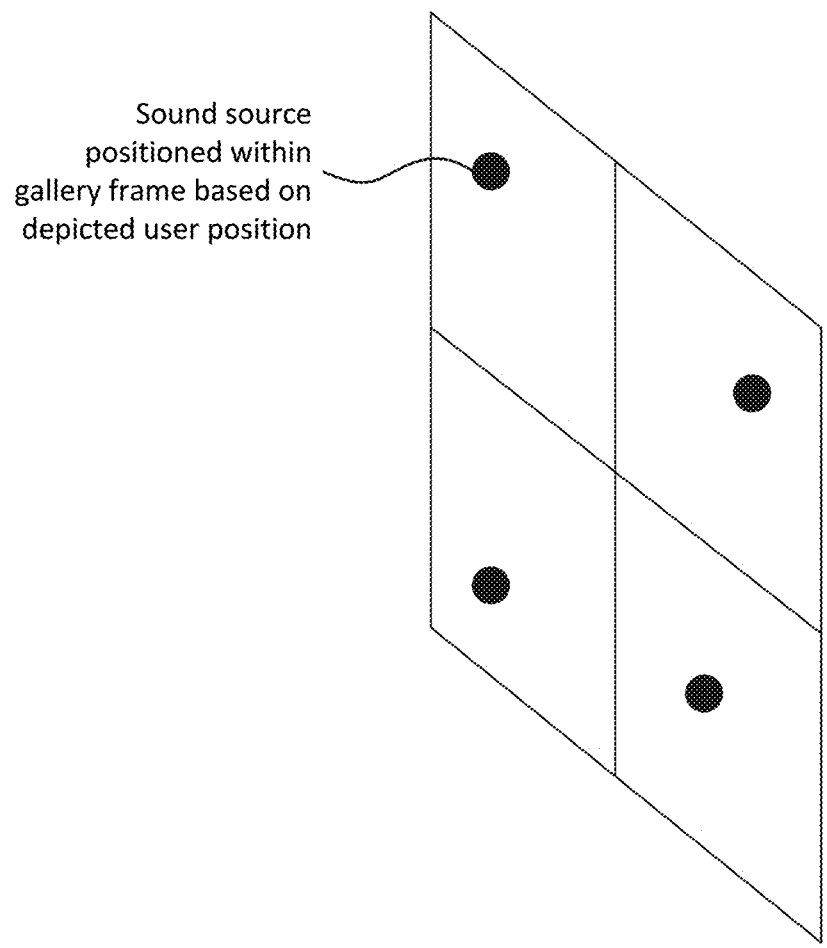

In some embodiments, as shown in FIG. 5, the position of a given sound source within a respective display area 105 may be different from the center of display area 105. For example, in some embodiments, the position of a particular sound source may be based on the position, orientation, and/or other attributes of a user depicted within display area 105. For example, UE 101 and/or SACS 201 may use image recognition techniques (e.g., which may include artificial intelligence/machine learning ("AI/ML") techniques such as computer vision or other techniques) to identify a user's face, mouth, eyes, etc. The sound source may be specified based on a direction the user is facing, a position of the user's mouth, etc.

Figure 6:
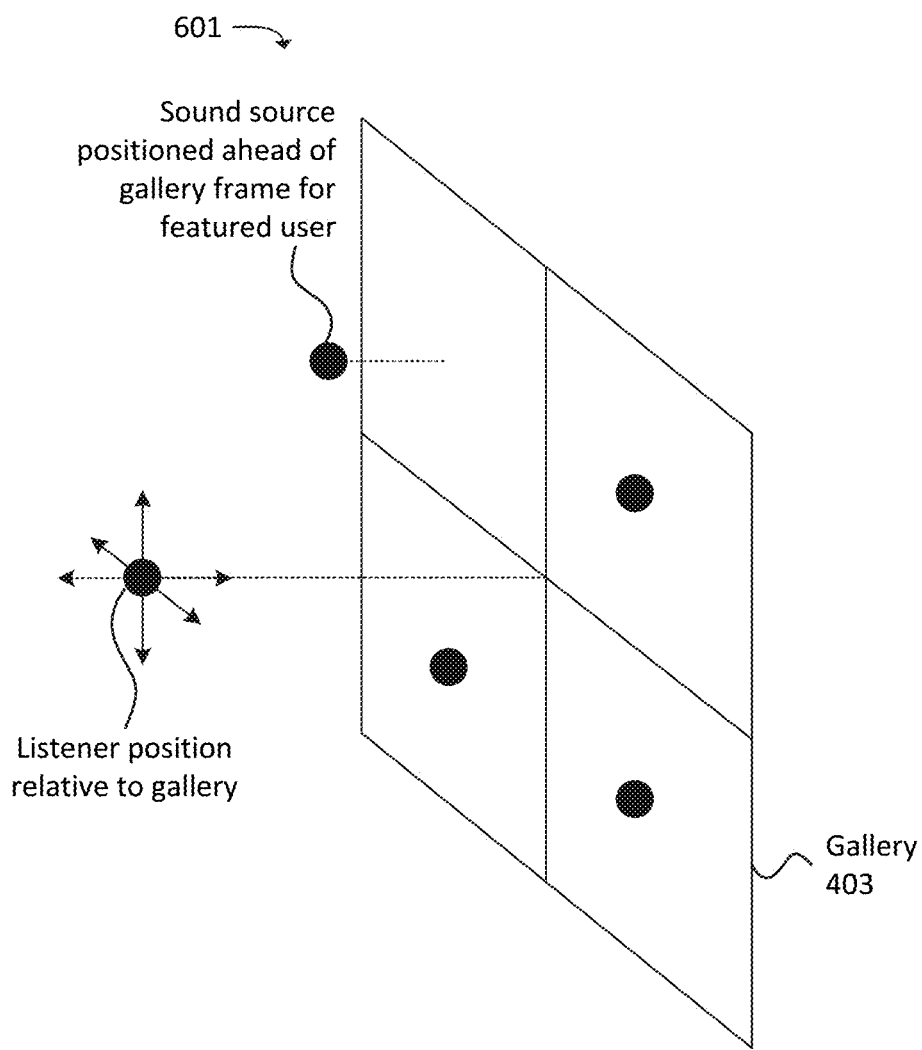

In some embodiments, as shown in FIG. 6, one or more sound sources may be positioned in a three-dimensional field 601 that includes gallery 403 (e.g., a two-dimensional plane representing gallery 403). As shown, one or more sound sources may be positioned differently on a third axis (e.g., a z-axis, where gallery 403 is associated with first and second axes such as x- and y-axes). For example, a particular gallery configuration information 205 may indicate that a given participant is a "featured" participant, such as a participant that has been speaking more frequently than other participants. As another example, a participant may be "featured" if indicated as a "presenter" or other type of specified participant of the conference. In some embodiments, different UEs 101 may specify different parameters regarding whether a given participant is "featured." As such, in the three-dimensional field 601 associated with a first UE 101, a sound source associated with a particular participant may be located in front of gallery 403, while in the three-dimensional field 601 associated with a second UE 101, a sound source associated with the same particular participant may be located at a different position in front of gallery 403, may be located on gallery 403, or may be located behind gallery 403 (e.g., where "front" and "behind" in this example correspond to a position of a listener, such as a user of UE 101).

Figure 7:
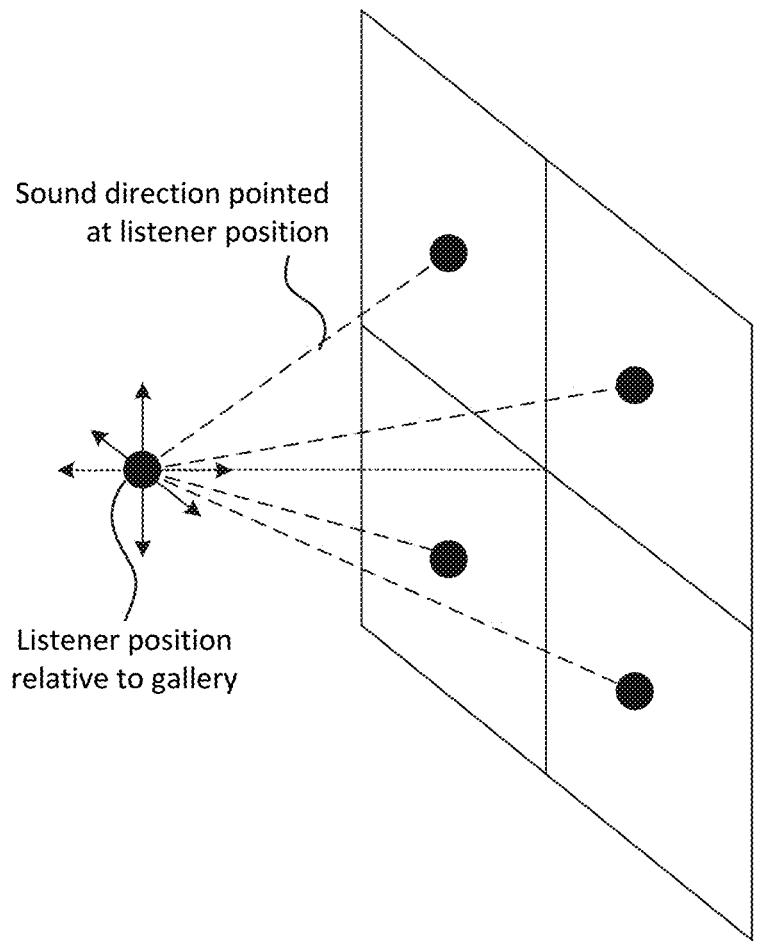

In some embodiments, a sound target may be specified for spatial audio 107. For example, as shown in FIG. 7, the position of a listener (e.g., a user of UE 101) may be specified as the target for spatial audio 107 associated with each respective conference participant. In some embodiments, UE 101 and/or SACS 201 may identify the position of the user of UE 101 based on captured video associated with UE 101. For example, using image recognition techniques, AI/ML techniques, or other suitable techniques, UE 101 and/or SACS 201 may identify the position of the user and SACS 201 may specify such position as a target for spatial audio 107, in embodiments where spatial audio 107 includes one or more parameters for specifying the target of spatial audio 107.

Figure 8:
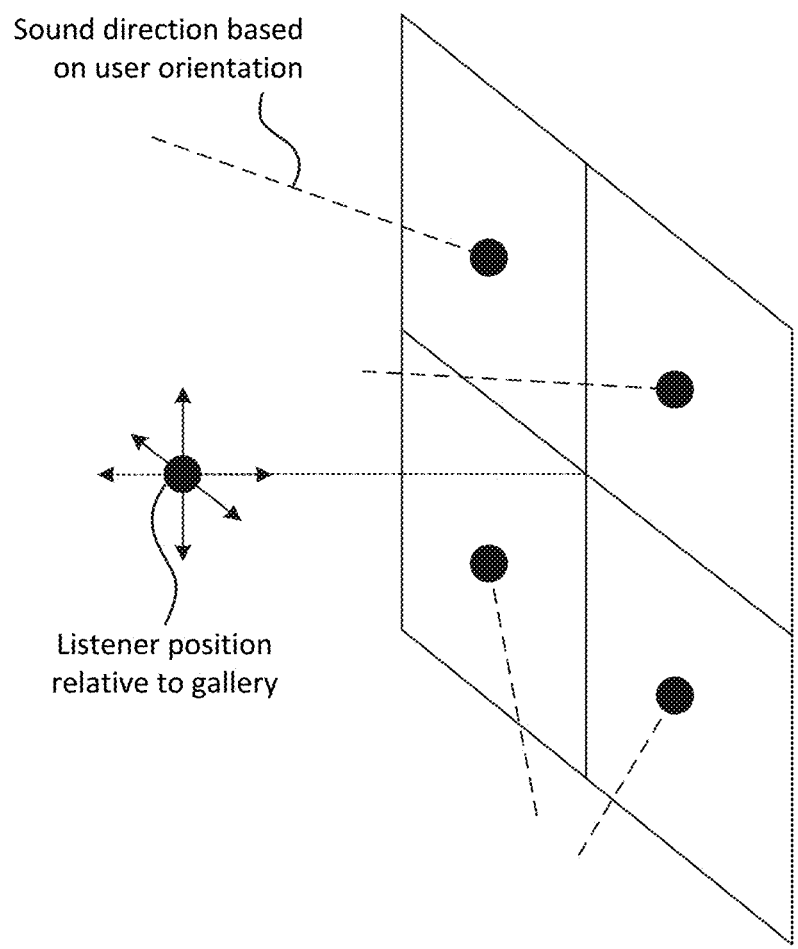

In some embodiments, as shown in FIG. 8, the sound target for spatial audio 107 may be specified based on a position and/or orientation of a user with which a given audio stream 207 is associated. As discussed above, UE 101 and/or SACS 201 may use image recognition techniques, AI/ML techniques, or other suitable techniques to identify an orientation, position within a particular display area 105, etc. associated with different participants of the conference. SACS 201 may, for example, set a target for each respective participant, in spatial audio stream 203, based on a direction in which the participant is facing. For example, if a participant is facing in a leftwards direction, the spatial audio stream 203 associated with the participant may be encoded, transformed, etc. such that the target of spatial audio 107 associated with the participant is in a leftwards direction.

Figure 9:
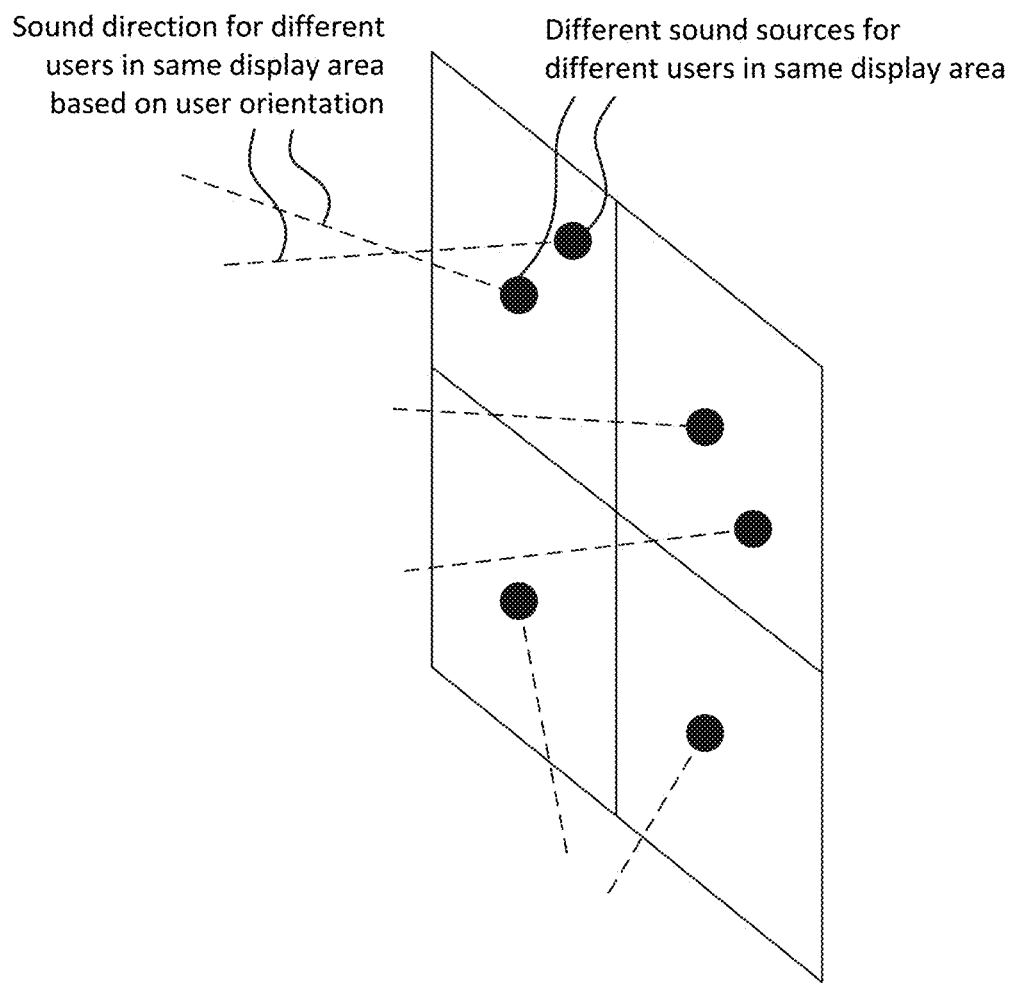

Similar concepts may apply in situations where multiple users are depicted in the same display area 105. For example, as shown in FIG. 9, the position and/or orientation of multiple users in the same display area 105 may be determined (as similarly described above), and respective spatial audio 107 for each one of the multiple users may be encoded, generated, etc. (e.g., by SACS 201) based on the position and/or orientation of the multiple users. For example, the sound source of a first user within a given display area 105 may be set to location of the first user within display area 105, and the sound source of a second user within the same display area 105 may be set to a location of the second user within display area 105. Additionally, or alternatively, the target of spatial audio 107 associated with the first user may be set based on a direction in which the first user is facing, and the target of spatial audio 107 associated with the second user may be set based on a direction in which the second user is facing. For example, image recognition techniques, voice recognition techniques (e.g., in which different users are associated with different voice models), AI/ML techniques, or the like may be used to identify which user is speaking, and the target and/or source of audio associated with the identified user may be set based on the position and/or orientation of the identified user within display area 105. In this manner, in situations such as conference rooms in which multiple users may be using the same camera, audio associated with such users may be presented in a way such that a listener may be more easily able to discern which particular user is speaking at any given time.

Figure 10:
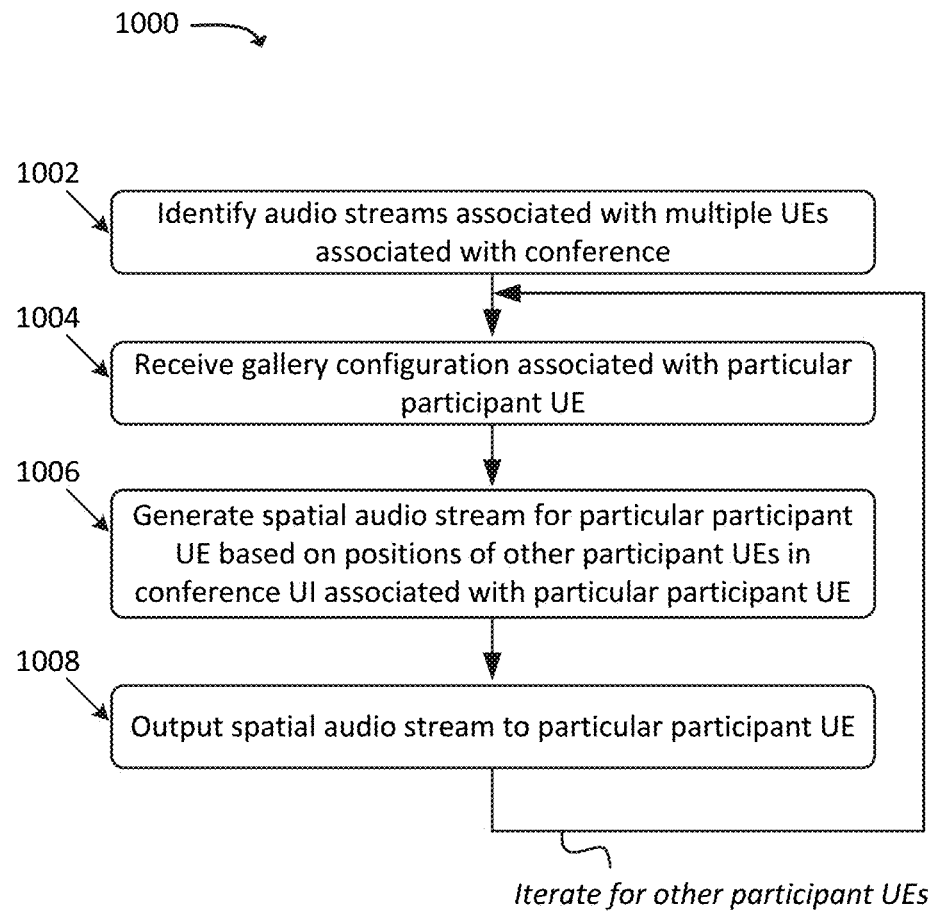
FIG. 10 illustrates an example process for providing spatial audio for a conference involving multiple participants, in accordance with some embodiments.

FIG. 10 illustrates an example process 1000 for providing spatial audio for a conference involving multiple participant UEs 101. In some embodiments, some or all of process 1000 may be performed by SACS 201. In some embodiments, one or more other devices may perform some or all of process 1000 in concert with, and/or in lieu of, SACS 201, such as UE 101.

As shown, process 1000 may include identifying (at 1002) audio streams associated with multiple UEs 101 associated with a conference. For example, as discussed above, SACS 201 may receive audio streams from participant UEs 101, which may include locally captured audio streams associated with each participant UE 101. Additionally, or alternatively, the audio streams may include automatically and/or programmatically generated audio based on information captured by or received by one or more particular participant UEs 101.

Process 1000 may further include receiving (at 1004) gallery configuration information associated with a particular participant UE 101. For example, as discussed above, SACS 201 may receive information from the particular participant UE 101 indicating dimensions, sizes, locations, etc. of one or more display areas 105 within a conference UI 103 associated with UE 101. In some embodiments, SACS 201 may receive an indication of a "preferred" or "non-preferred" participant (e.g., as indicated by UE 101 and/or some other participant UE), an indication of a position of a user of UE 101, and/or other suitable information.

Process 1000 may additionally include generating (at 1006) a spatial audio stream for the particular participant UE 101 based on positions of other participant UEs in conference UI 103 associated with the particular UE 101. For example, as discussed above, SACS 201 may specify a sound source, for each participant UE, based on the gallery configuration information provided (at 1004) by the particular UE 101. As discussed above, the sound source for a given participant UE may be within or proximate to a particular display area 105, within conference UI 103 associated with the particular UE 101. For example, in some embodiments, the sound source for a given participant UE may be centered within such display area 105, may be set to a position within display area 105 that is associated with a face, mouth, etc. of a user depicted within display area 105, etc. In some embodiments, as discussed above, a target of the spatial audio stream may be set based on a position of a user of the particular UE 101, may be set based on a position and/or orientation of a user with which such audio is associated, etc.

Process 1000 may also include outputting the spatial audio stream to the particular participant UE 101 (at 1008). For example, as discussed above, the spatial audio stream may be provided as a digital bitstream and/or in some other suitable format. In some embodiments, the spatial audio stream may be compressed, encoded, etc. by SACS 201 and decompressed, decoded, etc. by the particular UE 101. UE 101 may further present the spatial audio stream, such that audio associated with different participant UEs is presented with one or more transformations applied to provide the effect of sound originating at a location within UI 103, associated with the particular UE 101, that corresponds to a particular UE from which an audio stream was received.

Some or all of process 1000 may be repeated and/or performed iteratively for other participant UEs associated with the conference. In this manner, each participant UE may receive an individualized spatial audio stream based on particular conference configurations which may be different for each one of the participant UEs.

Figure 11:
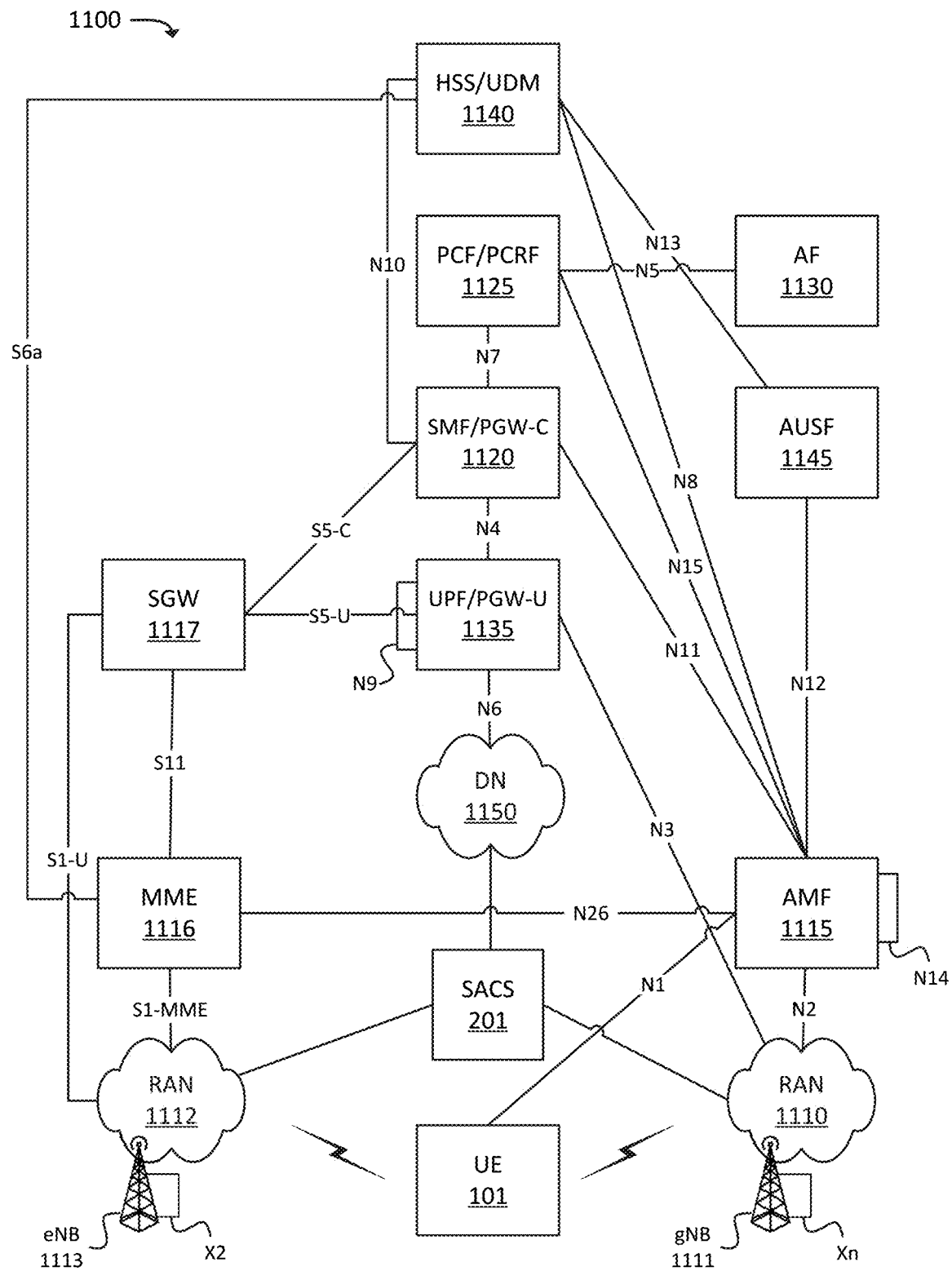
FIG. 11 illustrates an example environment in which one or more embodiments, described herein, may be implemented.

FIG. 11 illustrates an example environment 1100, in which one or more embodiments may be implemented. In some embodiments, environment 1100 may correspond to a 5G network, and/or may include elements of a 5G network. In some embodiments, environment 1100 may correspond to a 5G Non-Standalone ("NSA") architecture, in which a 5G radio access technology ("RAT") may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). As shown, environment 1100 may include UE 101, RAN 1110 (which may include one or more Next Generation Node Bs ("gNBs") 1111), RAN 1112 (which may include one or more one or more evolved Node Bs ("eNBs") 1113), and various network functions such as Access and Mobility Management Function ("AMF") 1115, Mobility Management Entity ("MME") 1116, Serving Gateway ("SGW") 1117, Session Management Function ("SMF")/Packet Data Network ("PDN") Gateway ("PGW")-Control plane function ("PGW-C") 1120, Policy Control Function ("PCF")/Policy Charging and Rules Function ("PCRF") 1125, Application Function ("AF") 1130, User Plane Function ("UPF")/PGW-User plane function ("PGW-U") 1135, Home Subscriber Server ("HSS")/Unified Data Management ("UDM") 1140, and Authentication Server Function ("AUSF") 1145. Environment 1100 may also include one or more networks, such as Data Network ("DN") 1150. Environment 1100 may include one or more additional devices or systems communicatively coupled to one or more networks (e.g., DN 1150), such as SACS 201, which may perform one or more operations described above.

The example shown in FIG. 11 illustrates one instance of each network component or function (e.g., one instance of SMF/PGW-C 1120, PCF/PCRF 1125, UPF/PGW-U 1135, HSS/UDM 1140, and/or AUSF 1145). In practice, environment 1100 may include multiple instances of such components or functions. For example, in some embodiments, environment 1100 may include multiple "slices" of a core network, where each slice includes a discrete set of network functions (e.g., one slice may include a first instance of SMF/PGW-C 1120, PCF/PCRF 1125, UPF/PGW-U 1135, HSS/UDM 1140, and/or AUSF 1145, while another slice may include a second instance of SMF/PGW-C 1120, PCF/PCRF 1125, UPF/PGW-U 1135, HSS/UDM 1140, and/or AUSF 1145). The different slices may provide differentiated levels of service, such as service in accordance with different Quality of Service ("QoS") parameters.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, etc. Alternatively, or additionally, one or more of the devices of environment 1100 may perform one or more network functions described as being performed by another one or more of the devices of environment 1100. Devices of environment 1100 may interconnect with each other and/or other devices via wired connections, wireless connections, or a combination of wired and wireless connections. In some implementations, one or more devices of environment 1100 may be physically integrated in, and/or may be physically attached to, one or more other devices of environment 1100.

UE 101 may include a computation and communication device, such as a wireless mobile communication device that is capable of communicating with RAN 1110, RAN 1112, and/or DN 1150. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 101 may send traffic to and/or receive traffic (e.g., user plane traffic) from DN 1150 via RAN 1110, RAN 1112, and/or UPF/PGW-U 1135.

RAN 1110 may be, or may include, a 5G RAN that includes one or more base stations (e.g., one or more gNBs 1111), via which UE 101 may communicate with one or more other elements of environment 1100. UE 101 may communicate with RAN 1110 via an air interface (e.g., as provided by gNB 1111). For instance, RAN 1110 may receive traffic (e.g., voice call traffic, data traffic, messaging traffic, signaling traffic, etc.) from UE 101 via the air interface, and may communicate the traffic to UPF/PGW-U 1135, and/or one or more other devices or networks. Similarly, RAN 1110 may receive traffic intended for UE 101 (e.g., from UPF/PGW-U 1135, AMF 1115, and/or one or more other devices or networks) and may communicate the traffic to UE 101 via the air interface.

RAN 1112 may be, or may include, a LTE RAN that includes one or more base stations (e.g., one or more eNBs 1113), via which UE 101 may communicate with one or more other elements of environment 1100. UE 101 may communicate with RAN 1112 via an air interface (e.g., as provided by eNB 1113). For instance, RAN 1110 may receive traffic (e.g., voice call traffic, data traffic, messaging traffic, signaling traffic, etc.) from UE 101 via the air interface, and may communicate the traffic to UPF/PGW-U 1135, and/or one or more other devices or networks. Similarly, RAN 1110 may receive traffic intended for UE 101 (e.g., from UPF/PGW-U 1135, SGW 1117, and/or one or more other devices or networks) and may communicate the traffic to UE 101 via the air interface.

AMF 1115 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 1110 and/or gNBs 1111, and/or to perform other operations. In some embodiments, the 5G network may include multiple AMFs 1115, which communicate with each other via the N14 interface (denoted in FIG. 11 by the line marked "N14" originating and terminating at AMF 1115).

MME 1116 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 1112 and/or eNBs 1113, and/or to perform other operations.

SGW 1117 may include one or more devices, systems, VNFs, etc., that aggregate traffic received from one or more eNBs 1113 and send the aggregated traffic to an external network or device via UPF/PGW-U 1135. Additionally, SGW 1117 may aggregate traffic received from one or more UPF/PGW-Us 1135 and may send the aggregated traffic to one or more eNBs 1113. SGW 1117 may operate as an anchor for the user plane during inter-eNB handovers and as an anchor for mobility between different telecommunication networks or RANs (e.g., RANs 1110 and 1112).

SMF/PGW-C 1120 may include one or more devices, systems, VNFs, etc., that gather, process, store, and/or provide information in a manner described herein. SMF/PGW-C 1120 may, for example, facilitate the establishment of communication sessions on behalf of UE 101. In some embodiments, the establishment of communications sessions may be performed in accordance with one or more policies provided by PCF/PCRF 1125.

PCF/PCRF 1125 may include one or more devices, systems, VNFs, etc., that aggregate information to and from the 5G network and/or other sources. PCF/PCRF 1125 may receive information regarding policies and/or subscriptions from one or more sources, such as subscriber databases and/or from one or more users (such as, for example, an administrator associated with PCF/PCRF 1125).

AF 1130 may include one or more devices, systems, VNFs, etc., that receive, store, and/or provide information that may be used in determining parameters (e.g., quality of service parameters, charging parameters, or the like) for certain applications.

UPF/PGW-U 1135 may include one or more devices, systems, VNFs, etc., that receive, store, and/or provide data (e.g., user plane data). For example, UPF/PGW-U 1135 may receive user plane data (e.g., voice call traffic, data traffic, etc.), destined for UE 101, from DN 1150, and may forward the user plane data toward UE 101 (e.g., via RAN 1110, SMF/PGW-C 1120, and/or one or more other devices). In some embodiments, multiple UPFs 1135 may be deployed (e.g., in different geographical locations), and the delivery of content to UE 101 may be coordinated via the N9 interface (e.g., as denoted in FIG. 11 by the line marked "N9" originating and terminating at UPF/PGW-U 1135). Similarly, UPF/PGW-U 1135 may receive traffic from UE 101 (e.g., via RAN 1110, SMF/PGW-C 1120, and/or one or more other devices), and may forward the traffic toward DN 1150. In some embodiments, UPF/PGW-U 1135 may communicate (e.g., via the N4 interface) with SMF/PGW-C 1120, regarding user plane data processed by UPF/PGW-U 1135.

HSS/UDM 1140 and AUSF 1145 may include one or more devices, systems, VNFs, etc., that manage, update, and/or store, in one or more memory devices associated with AUSF 1145 and/or HSS/UDM 1140, profile information associated with a subscriber. AUSF 1145 and/or HSS/UDM 1140 may perform authentication, authorization, and/or accounting operations associated with the subscriber and/or a communication session with UE 101.

DN 1150 may include one or more wired and/or wireless networks. For example, DN 1150 may include an Internet Protocol ("IP")-based PDN, a wide area network ("WAN") such as the Internet, a private enterprise network, and/or one or more other networks. UE 101 may communicate, through DN 1150, with data servers, other UEs 101, and/or to other servers or applications that are coupled to DN 1150. DN 1150 may be connected to one or more other networks, such as a public switched telephone network ("PSTN"), a public land mobile network ("PLMN"), and/or another network. DN 1150 may be connected to one or more devices, such as content providers, applications, web servers, and/or other devices, with which UE 101 may communicate.

Figure 12:
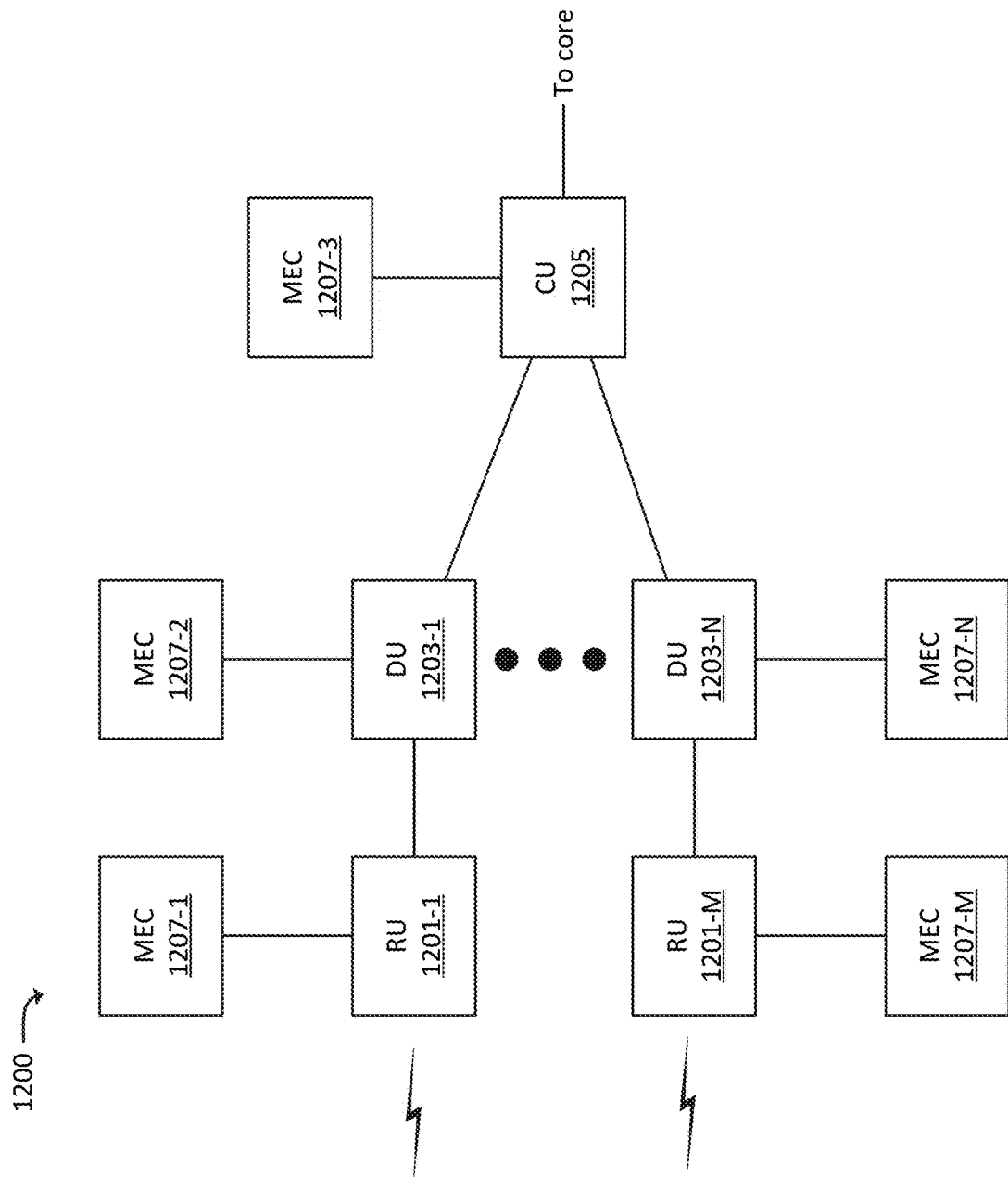
FIG. 12 illustrates an example arrangement of a radio access network ("RAN"), in accordance with some embodiments.

FIG. 12 illustrates an example Distributed Unit ("DU") network 1200, which may be included in and/or implemented by one or more RANs (e.g., RAN 1110, RAN 1112, or some other RAN). In some embodiments, a particular RAN may include one DU network 1200. In some embodiments, a particular RAN may include multiple DU networks 1200. In some embodiments, DU network 1200 may correspond to a particular gNB 1111 of a 5G RAN (e.g., RAN 1110). In some embodiments, DU network 1200 may correspond to multiple gNBs 1111. In some embodiments, DU network 1200 may correspond to one or more other types of base stations of one or more other types of RANs. As shown, DU network 1200 may include Central Unit ("CU") 1205, one or more Distributed Units ("DUs") 1203-1 through 1203-N (referred to individually as "DU 1203," or collectively as "DUs 1203"), and one or more Radio Units ("RUs") 1201-1 through 1201-M (referred to individually as "RU 1201," or collectively as "RUs 1201").

CU 1205 may communicate with a core of a wireless network (e.g., may communicate with one or more of the devices or systems described above with respect to FIG. 11, such as AMF 1115 and/or UPF/PGW-U 1135). In the uplink direction (e.g., for traffic from UEs 101 to a core network), CU 1205 may aggregate traffic from DUs 1203, and forward the aggregated traffic to the core network. In some embodiments, CU 1205 may receive traffic according to a given protocol (e.g., Radio Link Control ("RLC")) from DUs 1203, and may perform higher-layer processing (e.g., may aggregate/process RLC packets and generate Packet Data Convergence Protocol ("PDCP") packets based on the RLC packets) on the traffic received from DUs 1203.

In accordance with some embodiments, CU 1205 may receive downlink traffic (e.g., traffic from the core network) for a particular UE 101, and may determine which DU(s) 1203 should receive the downlink traffic. DU 1203 may include one or more devices that transmit traffic between a core network (e.g., via CU 1205) and UE 101 (e.g., via a respective RU 1201). DU 1203 may, for example, receive traffic from RU 1201 at a first layer (e.g., physical ("PHY") layer traffic, or lower PHY layer traffic), and may process/aggregate the traffic to a second layer (e.g., upper PHY and/or RLC). DU 1203 may receive traffic from CU 1205 at the second layer, may process the traffic to the first layer, and provide the processed traffic to a respective RU 1201 for transmission to UE 101.

RU 1201 may include hardware circuitry (e.g., one or more RF transceivers, antennas, radios, and/or other suitable hardware) to communicate wirelessly (e.g., via an RF interface) with one or more UEs 101, one or more other DUs 1203 (e.g., via RUs 1201 associated with DUs 1203), and/or any other suitable type of device. In the uplink direction, RU 1201 may receive traffic from UE 101 and/or another DU 1203 via the RF interface and may provide the traffic to DU 1203. In the downlink direction, RU 1201 may receive traffic from DU 1203, and may provide the traffic to UE 101 and/or another DU 1203.

RUs 1201 may, in some embodiments, be communicatively coupled to one or more MECs 1207. For example, RU 1201-1 may be communicatively coupled to MEC 1207-1, RU 1201-M may be communicatively coupled to MEC 1207-M, DU 1203-1 may be communicatively coupled to MEC 1207-2, DU 1203-N may be communicatively coupled to MEC 1207-N, CU 1205 may be communicatively coupled to MEC 1207-3, and so on. MECs 1207 may include hardware resources (e.g., configurable or provisionable hardware resources) that may be configured to provide services and/or otherwise process traffic to and/or from UE 101, via a respective RU 1201.

For example, RU 1201-1 may route some traffic, from UE 101, to MEC 1207-1 instead of to a core network (e.g., via DU 1203 and CU 1205). MEC 1207-1 may process the traffic, perform one or more computations based on the received traffic, and may provide traffic to UE 101 via RU 1201-1. In this manner, ultra-low latency services may be provided to UE 101, as traffic does not need to traverse DU 1203, CU 1205, and an intervening backhaul network between DU network 1200 and the core network. In some embodiments, MEC 1207 may include, and/or may implement, some or all of the functionality described above with respect to SACS 201.

Figure 13:
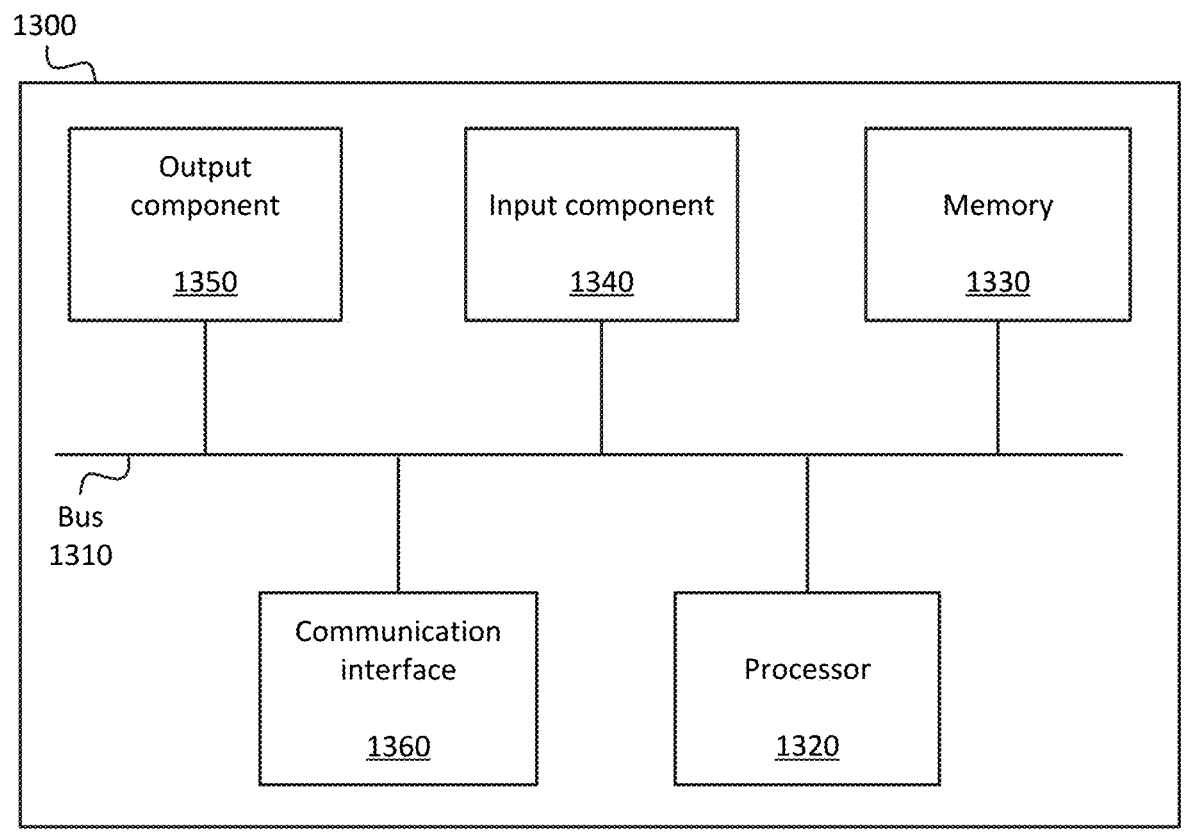
FIG. 13 illustrates example components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. In some embodiments, processor 1320 may be or may include one or more hardware processors. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300 and/or other receives or detects input from a source external to 1340, such as a touchpad, a touchscreen, a keyboard, a keypad, a button, a switch, a microphone or other audio input component, etc. In some embodiments, input component 1340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-10), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
present a user interface ("UI") associated with a conference that includes a plurality of User Equipment ("UEs");
receive an audio stream associated with a particular UE of the plurality of UEs;
identify a position within the UI that is associated with the particular UE; and
audibly present the audio stream associated with the particular UE, wherein audibly presenting the audio stream associated with the particular UE includes:
setting the position within the UI, that is associated with the particular UE, as a sound source of the audio stream,
identifying a user, associated with the particular UE, depicted within the UI as presented at the device,
identifying a direction in which the user is facing, and
setting a direction of the audio stream, as audibly presented at the device, as the direction in which the user is facing.

2. The device of claim 1, wherein audibly presenting the audio stream associated with the particular UE includes generating a positional audio stream based on the received audio stream.

3. The device of claim 1, wherein the particular UE is a first UE, wherein the audio stream is a first audio stream, and wherein the position within the UE associated with the first UE is a first position, wherein the one or more processors are further configured to:
receive a second audio stream associated with a second UE of the plurality of UEs;
identify a second position within the UE that is associated with the second UE; and
audibly present the second audio stream associated with the second UE, wherein audibly presenting the second audio stream associated with the second UE includes setting the second position, within the UI, as a sound source of the second audio stream.

4. The device of claim 1, wherein the UI includes a plurality of display areas that are each associated with a respective UE, of the plurality of UEs,
wherein identifying the position within the UI that is associated with the particular UE includes identifying a particular display area, of the plurality of display areas, that is associated with the particular UE, and
wherein setting the position within the UI as the sound source of the audio stream includes setting a location within the particular display area as the sound source of the audio stream.

5. The device of claim 4, wherein the one or more processors are further configured to:

identify a particular position, within the particular display area, at which the user is depicted, wherein setting the position within the UI as the sound source of the audio stream includes setting the particular position, within the particular display area, as the sound source of the audio stream.

6. The device of claim 1, wherein different positions within the UI are associated with different UEs from which respective audio streams are received.

7. The device of claim 1, wherein the particular UE is a first UE and wherein the UI is a first UI,
 wherein the first UI includes a first position that is associated with a second UE of the plurality of UEs, and
 wherein a second UI, associated with the first UE, includes a second position that is associated with the second UE, wherein the first position within the first UI is different from a second position within the second UI.

8. A non-transitory computer-readable medium, storing a plurality of processor-executable instructions to:
 present a user interface ("UI") associated with a conference that includes a plurality of User Equipment ("UEs");
 receive an audio stream associated with a particular UE of the plurality of UEs;
 identify a position within the UI that is associated with the particular UE; and
 audibly present the audio stream associated with the particular UE, wherein audibly presenting the audio stream associated with the particular UE includes:
  setting the position within the UI, that is associated with the particular UE, as a sound source of the audio stream,
  identifying a user, associated with the particular UE, depicted within the UI as presented at the device,
  identifying a direction in which the user is facing, and
  setting a direction of the audio stream, as audibly presented at the device, as the direction in which the user is facing.

9. The non-transitory computer-readable medium of claim 8, wherein audibly presenting the audio stream associated with the particular UE includes generating a positional audio stream based on the received audio stream.

10. The non-transitory computer-readable medium of claim 8, wherein the particular UE is a first UE, wherein the audio stream is a first audio stream, and wherein the position within the UE associated with the first UE is a first position, wherein the plurality of processor-executable instructions further include processor-executable instructions to:
 receive a second audio stream associated with a second UE of the plurality of UEs;
 identify a second position within the UE that is associated with the second UE; and
 audibly present the second audio stream associated with the second UE, wherein audibly presenting the second audio stream associated with the second UE includes setting the second position, within the UI, as a sound source of the second audio stream.

11. The non-transitory computer-readable medium of claim 8, wherein the UI includes a plurality of display areas that are each associated with a respective UE, of the plurality of UEs,
 wherein identifying the position within the UI that is associated with the particular UE includes identifying a particular display area, of the plurality of display areas, that is associated with the particular UE, and
 wherein setting the position within the UI as the sound source of the audio stream includes setting a location within the particular display area as the sound source of the audio stream.

12. The non-transitory computer-readable medium of claim 11, wherein the plurality of processor-executable instructions further include processor-executable instructions to:
 identify a particular position, within the particular display area, at which the user is depicted, wherein setting the position within the UI as the sound source of the audio stream includes setting the particular position, within the particular display area, as the sound source of the audio stream.

13. The non-transitory computer-readable medium of claim 8, wherein different positions within the UI are associated with different UEs from which respective audio streams are received.

14. The non-transitory computer-readable medium of claim 8, wherein the particular UE is a first UE and wherein the UI is a first UI,
 wherein the first UI includes a first position that is associated with a second UE of the plurality of UEs, and
 wherein a second UI, associated with the first UE, includes a second position that is associated with the second UE, wherein the first position within the first UI is different from a second position within the second UI.

15. A method, comprising:
 presenting a user interface ("UI") associated with a conference that includes a plurality of User Equipment ("UEs");
 receiving an audio stream associated with a particular UE of the plurality of UEs;
 identifying a position within the UI that is associated with the particular UE; and
 audibly presenting the audio stream associated with the particular UE, wherein audibly presenting the audio stream associated with the particular UE includes:
  setting the position within the UI, that is associated with the particular UE, as a sound source of the audio stream,
  identifying a user, associated with the particular UE, depicted within the UI as presented at the device,
  identifying a direction in which the user is facing, and
  setting a direction of the audio stream, as audibly presented at the device, as the direction in which the user is facing.

16. The method of claim 15, wherein audibly presenting the audio stream associated with the particular UE includes generating a positional audio stream based on the received audio stream.

17. The method of claim 15, wherein the particular UE is a first UE, wherein the audio stream is a first audio stream, and wherein the position within the UE associated with the first UE is a first position, the method further comprising:
 receiving a second audio stream associated with a second UE of the plurality of UEs;
 identifying a second position within the UE that is associated with the second UE; and
 audibly presenting the second audio stream associated with the second UE, wherein audibly presenting the second audio stream associated with the second UE includes setting the second position, within the UI, as a sound source of the second audio stream.

18. The method of claim 15, wherein the UI includes a plurality of display areas that are each associated with a respective UE, of the plurality of UEs,
- wherein identifying the position within the UI that is associated with the particular UE includes identifying a particular display area, of the plurality of display areas, that is associated with the particular UE, and
- wherein setting the position within the UI as the sound source of the audio stream includes setting a location within the particular display area as the sound source of the audio stream.

19. The method of claim 15, wherein the particular UE is a first UE and wherein the UI is a first UI,
- wherein the first UI includes a first position that is associated with a second UE of the plurality of UEs, and
- wherein a second UI, associated with the first UE, includes a second position that is associated with the second UE, wherein the first position within the first UI is different from a second position within the second UI.

20. The method of claim 18, further comprising:
- identifying a particular position, within the particular display area, at which the user is depicted, wherein setting the position within the UI as the sound source of the audio stream includes setting the particular position, within the particular display area, as the sound source of the audio stream.

* * * * *